United States Patent [19]

Strzyzynski et al.

[11] 3,954,375
[45] May 4, 1976

[54] MANDREL AND PREFORM ASSEMBLY

[75] Inventors: Jerome A. Strzyzynski, Franklin Park; Charles Richard Hallengren, Deerfield, both of Ill.

[73] Assignee: Illinois Tool Works Inc., Chicago, Ill.

[22] Filed: Jan. 20, 1975

[21] Appl. No.: 542,534

Related U.S. Application Data

[62] Division of Ser. No. 409,511, Nov. 5, 1973.

[52] U.S. Cl. .................... 425/403; 425/DIG. 204; 425/DIG. 206; 425/DIG. 207; 425/DIG. 209
[51] Int. Cl.² ........................................ B29D 23/03
[58] Field of Search.. 425/403, DIG. 204, DIG. 206, 425/DIG. 207, DIG. 209

[56] References Cited
UNITED STATES PATENTS

| | | | |
|---|---|---|---|
| 2,914,799 | 12/1959 | Canfield | 425/DIG. 209 |
| 3,412,186 | 11/1968 | Piotrowski | 425/DIG. 209 |
| 3,816,046 | 6/1974 | Farrell | 425/DIG. 209 |
| 3,842,149 | 10/1974 | Vollers | 425/DIG. 209 |

*Primary Examiner*—Francis S. Husar
*Assistant Examiner*—Gus T. Hampilos
*Attorney, Agent, or Firm*—E. L. Benno; R. W. Beart

[57] ABSTRACT

A molding machine into which nested stacks of preforms or parisons at ambient temperatures are loaded, which denests and applies the preforms individually onto complementary shaped mandrels in the machine. The preforms are made of a thermoplastic material, such as polystyrene, and the mandrels of the molding machine are internally heated to heat each parison as the machine is intermittently rotated. The mandrels are circumferentially mounted about a carriage in the machine and the carriage rotates about a horizontal axis. When viewing the machine at the side at which the carriage rotates in a counterclockwise direction, the preforms are individually applied to the mandrels at the three o'clock position by a loading mechanism. From the three o'clock position around and to the six o'clock position each preform is being heated on its mandrel. At the six o'clock position a split mold closes about the preform and air under pressure is directed through the mandrel to cause the heated preform to expand to the mold configuration and be cooled upon engagement with the mold walls. A pick-off mechanism at the four o'clock position removes the finished reformed article from each mandrel and releases the finished article from the machine to container filling lines.

7 Claims, 11 Drawing Figures

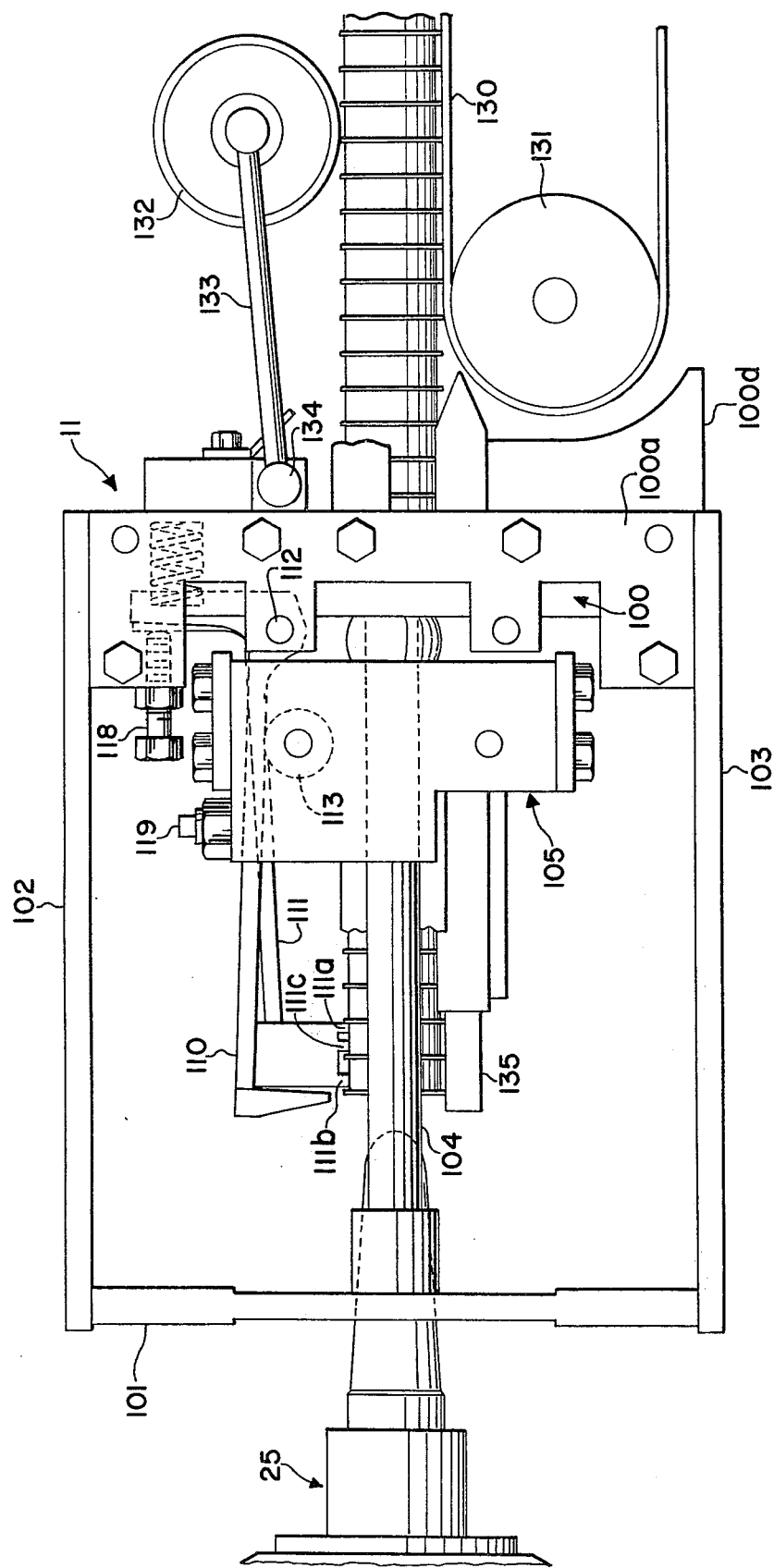

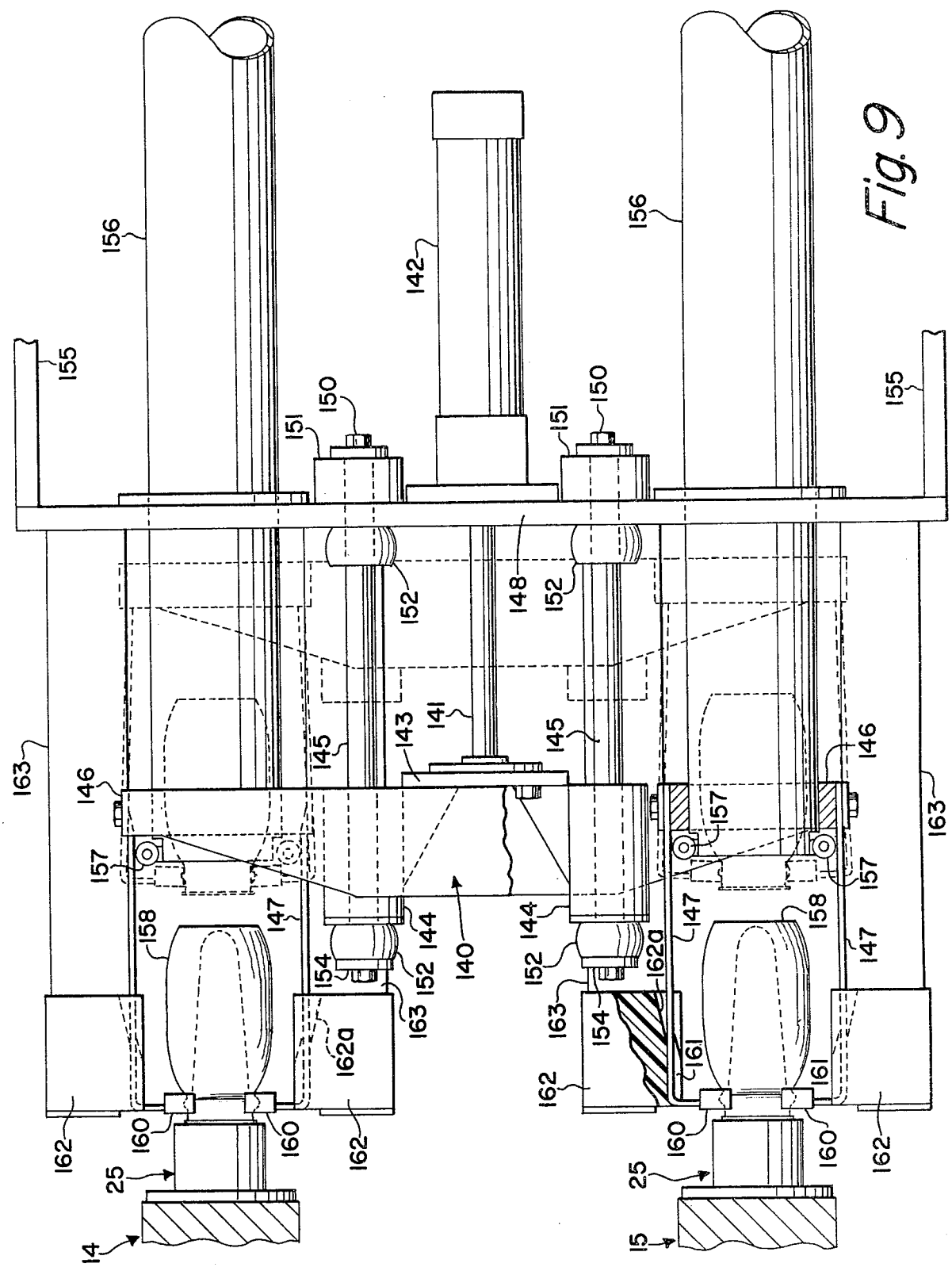

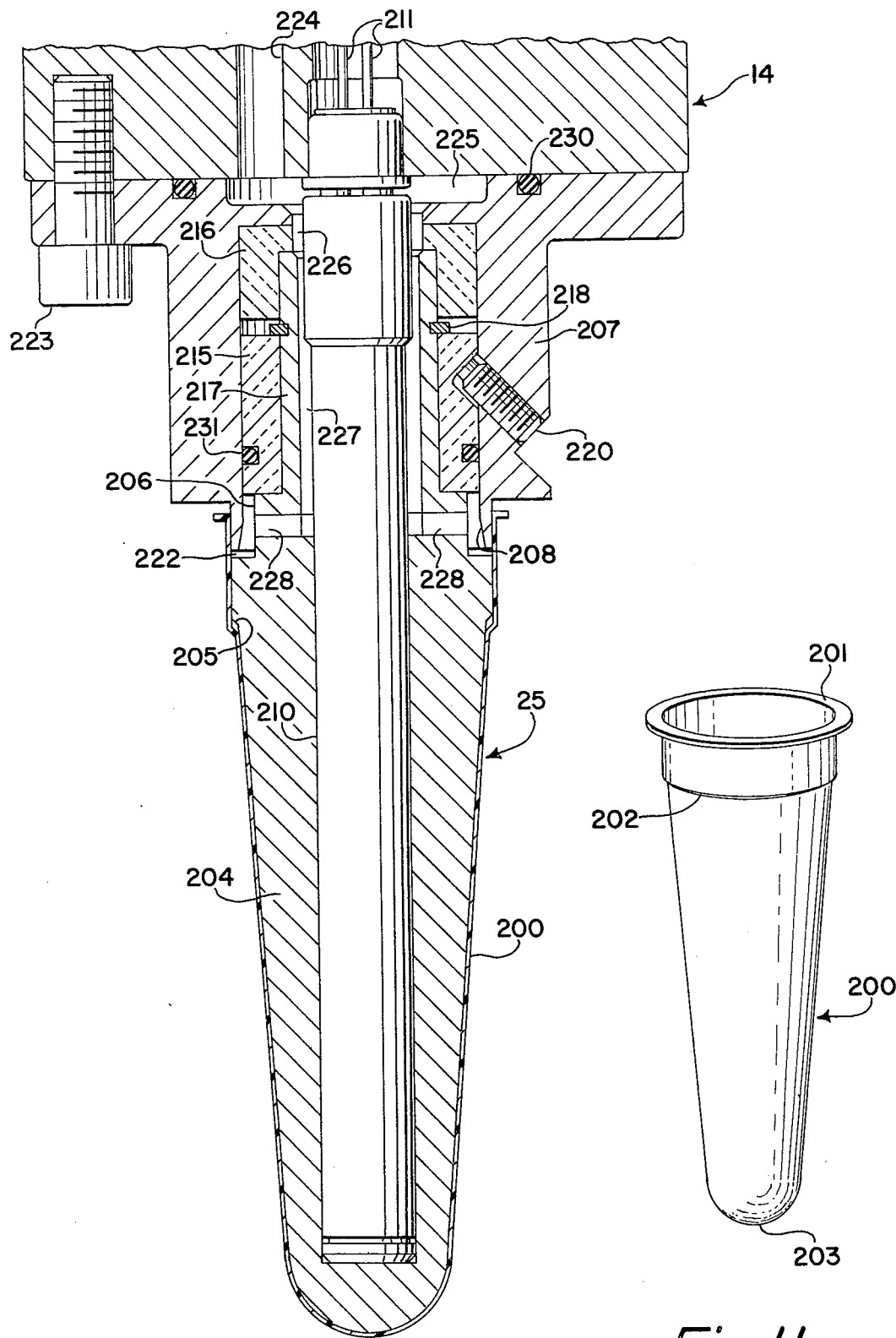

MANDREL AND PREFORM ASSEMBLY

This is a division of application Ser. No. 409,511, filed Nov. 5, 1973.

BACKGROUND OF THE INVENTION

Many molding machines are known in the prior art which will blow mold a parison into a finished container. Prior art molding machines commonly use a preform which has been heated prior to delivery of the parison to the molding machine. Such arrangements are common in the prior art because the manufacture of the preform and the blowing of the preform into a finished container are generally conducted in the same machine, as in well known injection-blow molding machines and extrusion-blow molding machines. Further generally in the prior art, where blow molding machines are known to accept relatively cool preforms or preforms at ambient temperatures, such blow molding machines generally have ovens through which the preforms are carried for heating prior to blowing.

Other prior art blow molding machines which will accept an ambient temperature preform commonly use preforms which are substantially thick discs or shallow plate-like preforms. Such blow molding machines are used where it is desirable to provide bi-axial orientation of the finished container in the blow molding machine. Such blow molding machines heat the disc or shallow preform in an oven, then generally stretch the preform in one direction to produce molecular orientation in the direction of stretching and thereafter blow the stretched preform in directions substantially perpendicular to the direction of stretching to form a finished container with bi-axial orientation therein.

SUMMARY OF THE INVENTION

As opposed to the known prior art molding machines, the molding machine of the subject invention accepts nested stacks of preforms which are at ambient temperatures. Further, those preforms are made of a thermoplastic material and are relatively thin walled. Because of the relatively thin wall of the preforms used in the subject invention, the preforms must be properly firmly applied to the mandrels of the machine with uniform surface contact between the mandrels and the inner surface of the preforms in order that the mondrels, which are internally heated, can properly and without hot or cold spots bring the preforms uniformly to proper molding temperatures. With such preforms it is further desirable and necessary that the heating cycle of the machine be such as to accurately bring the relatively thin walled preforms to proper molding temperatures within a reasonable period of time. However, that reasonable period of time must be relatively short if the molding machine is to be practical as a relatively high speed machine.

When such preforms are at proper molding temperatures they are thereafter associated with a female blow mold for proper and efficient blowing of the preform into reformed articles. After the preforms have been blown into reformed articles and cooled in the female blow molds, the reformed articles must be efficiently removed from the mandrels and discharged from the machine with the mandrels then moving to the appropriate position to again receive successive cool preforms.

The molding machine of the subject invention fulfills the foregoing requirements in a simple, compact and economical arrangement that will continuously operate to receive stacks of thin-walled nested preforms at ambient temperatures and will denest, heat, blow, cool and discharge the reformed articles from the machine in a rapid and efficient manner.

The primary object of the present invention is to provide a continuously operating blow molding machine that will receive a stack of nested relatively thin-walled thermoplastic preforms at ambient temperatures, that will denest and individually process each preform, that will hold the preforms by the interior surface thereof, that will accurately and uniformly heat the preforms to suitable blow molding temperatures by heat conducted through the preforms internally thereof, that will accurately blow the heated preforms into reformed articles, suitably cool the blown articles, and that will positively and accurately discharge those reformed articles in an oriented position for delivery to other equipment such as filling machines.

Other object and the features of the invention will be apparent upon a perusal of the hereinafter following specification taken in conjunction with the drawings.

IN THE DRAWINGS

FIG. 6 is an enlarged fragmentary side elevational view of the loading structure shown at substantially three o'clock in FIG. 1;

FIG. 9 is an enlarged top view of the unloading mechanism of the machine shown in FIG. 1 and taken substantially in the direction of line 9—9 of FIG. 1;

FIG. 10 is an enlarged cross-sectional view of one of the mandrel and mandrel holder assemblies of the machine; and FIG. 11 is a perspective view of one of the preforms for the machine of the invention.

DETAILED DESCRIPTION OF THE PREFERRED EMBODIMENT

Figure 1:
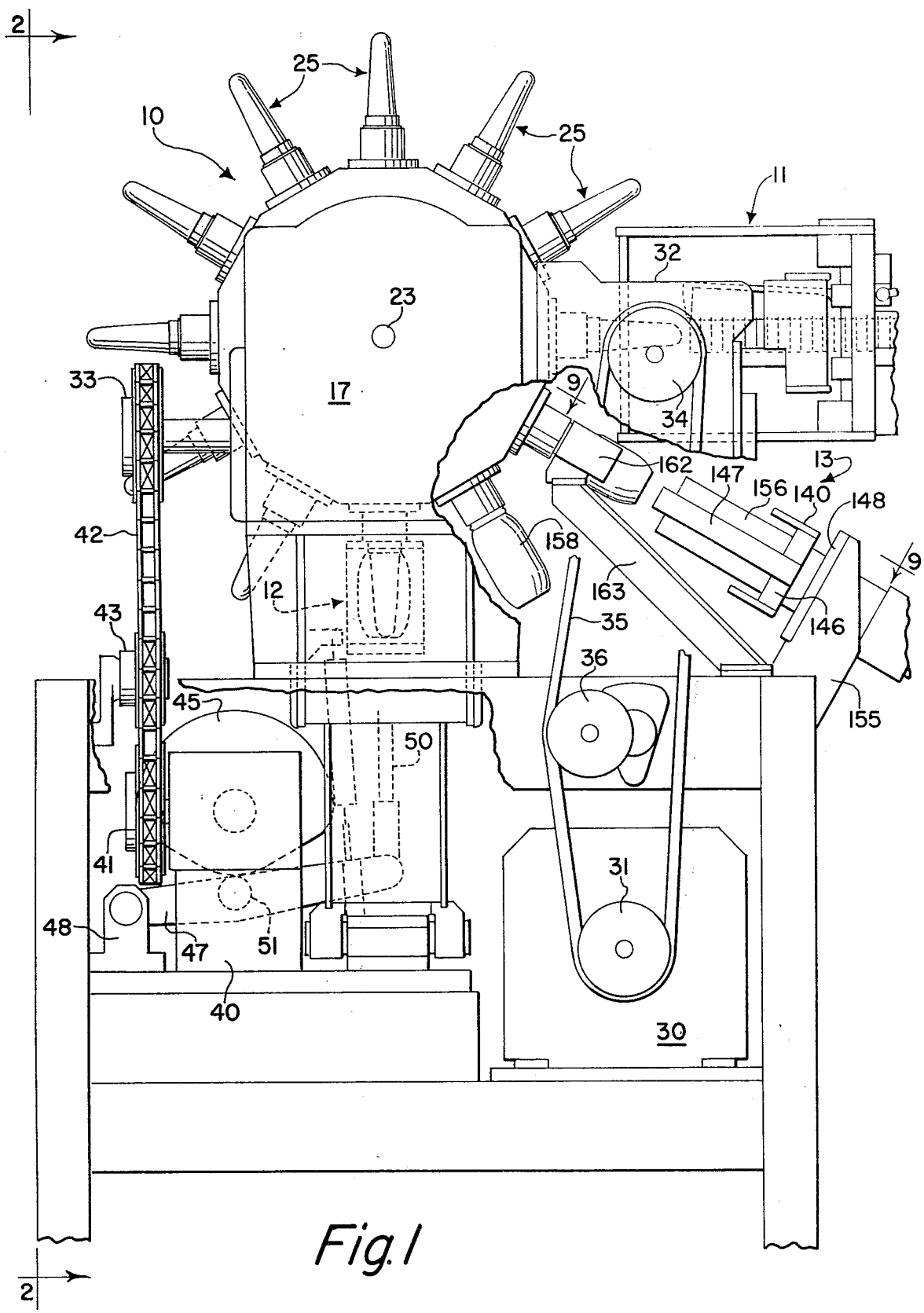
FIG. 1 is a side elevational view of the machine of the invention.
Figure 2:
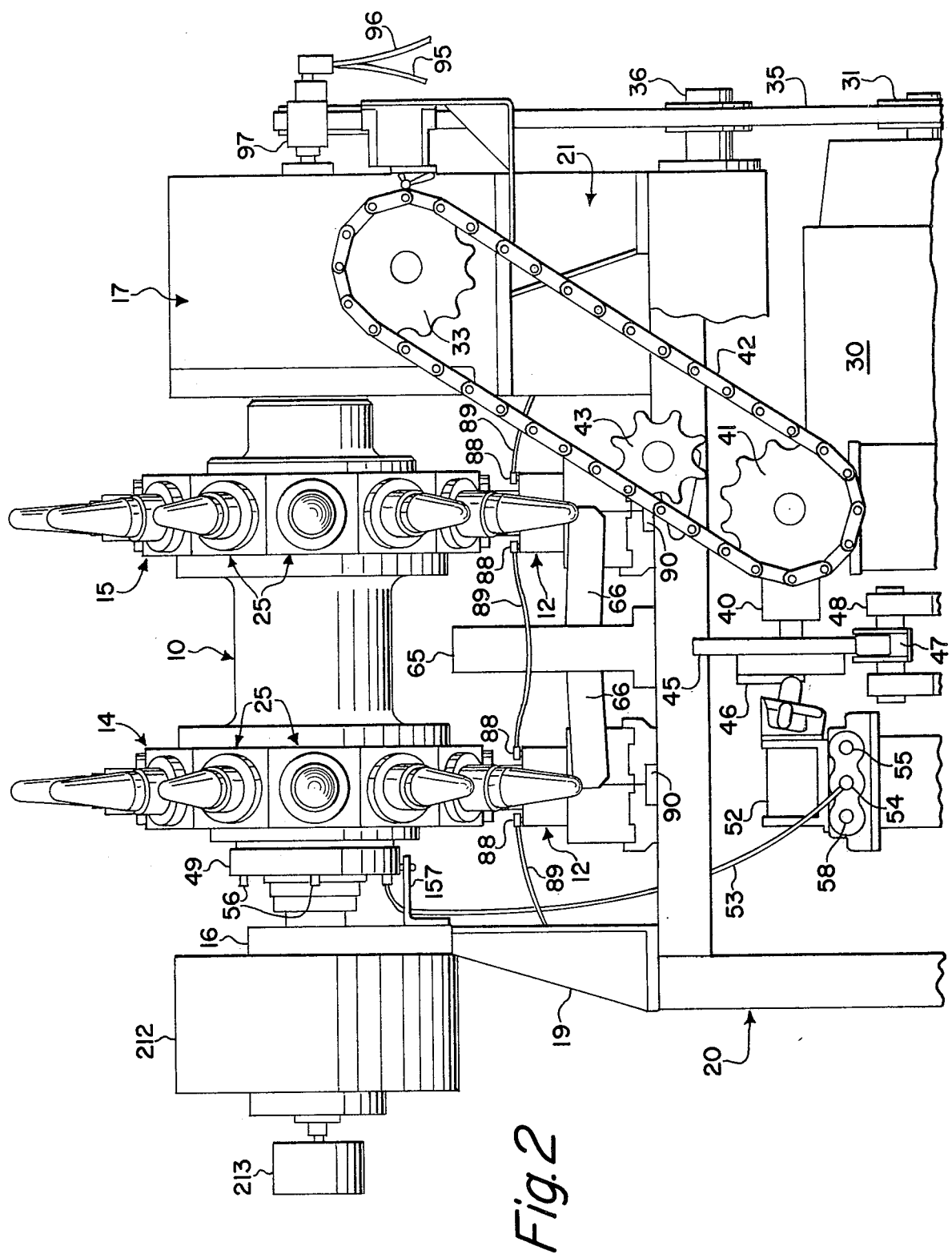
FIG. 2 is a side elevational view of the machine shown in FIG. 1 and taken substantially in the direction of line 2—2 of FIG. 1.

As shown in FIGS. 1 and 2, the molding machine of the subject invention comprises a carriage assembly 10, a loading assembly 11, a mold assembly 12, and an unloading assembly 13.

In the preferred embodiment, the carriage assembly 10 comprises two mandrel sections 14 and 15 mounted in the carriage 10 in a parallel spaced-apart relationship as shown in FIG. 2. The carriage 10 is rotationally mounted between a bearing assembly 16 and an index drive mechanism 17. The bearing assembly 16 is mounted on bracket 19 which in turn is secured to the frame 20. The index drive mechanism 17 is mounted to the frame 20 through suitable brackets such as brackets 21. The index drive mechanism 17, which may be of any suitable type known in the art, will rotate the carriage 10 intermittently in a counterclockwise direction as viewed in FIG. 1 about the horizontally disposed axis 23. Such known index drive mechanisms commonly use a geneva movement to produce the intermittent rotary drive. Because each of the mandrel sections 14 and 15 of the described preferred embodiment has twelve mandrel and mandrel holder assemblies 25, the index drive mechanism 17 will incrementally rotate the carriage 10 through angles of 30°. In one reduction to practice each rotation of the carriage 10 through the noted angle of 30° occurred in about 0.25 seconds and the carriage was stopped for a period of about 0.75 seconds. The subject invention contemplates other numbers of mandrel and holder assemblies 25 and other rotating speeds and dwell periods. For example, eight mandrel and mandrel holder assemblies 25 may be provided in each of the sections 14 and 15 with the index drive 17 then being adjusted to rotate the carriage 10 intermittently through angles of 45°. The loading, blowing and unloading operations all occur during the dwell periods of the carriage 10.

The index drive mechanism 17 is further adjusted so that the stopped positions of the mandrel and holder assemblies 25 are at the hour positions of a clock. The loading mechanism 11 is mounted in the machine on suitable frame members to support, denest and apply preforms to the mandrel and holder assemblies 25 at the three o'clock position. Each of the mandrel and holder assemblies 25 has an internally mounted electrical heater, and as the index drive mechanism 17 intermittently rotates the carriage 10 from the three o'clock position around and through the seven o'clock position as viewed in FIG. 1, the heated mandrels will internally conductively heat the preforms mounted thereon to proper molding temperatures. The preforms for the machine are as shown at 200 in FIG. 11. In the noted reduction to practice the heating period for each preform from the three o'clock position to and through the seven o'clock position was about 8 seconds and during that period each preform was heated from ambient temperature (about 70°F.) to a temperature of substantially 250°F. Thermocouples in selected mandrel and holder assemblies 25 to control the mandrel temperatures maintained the mandrels at substantially 250° F. The preforms used were a polystyrene material and had an average wall thickness of 0.030 inches.

Figure 3:
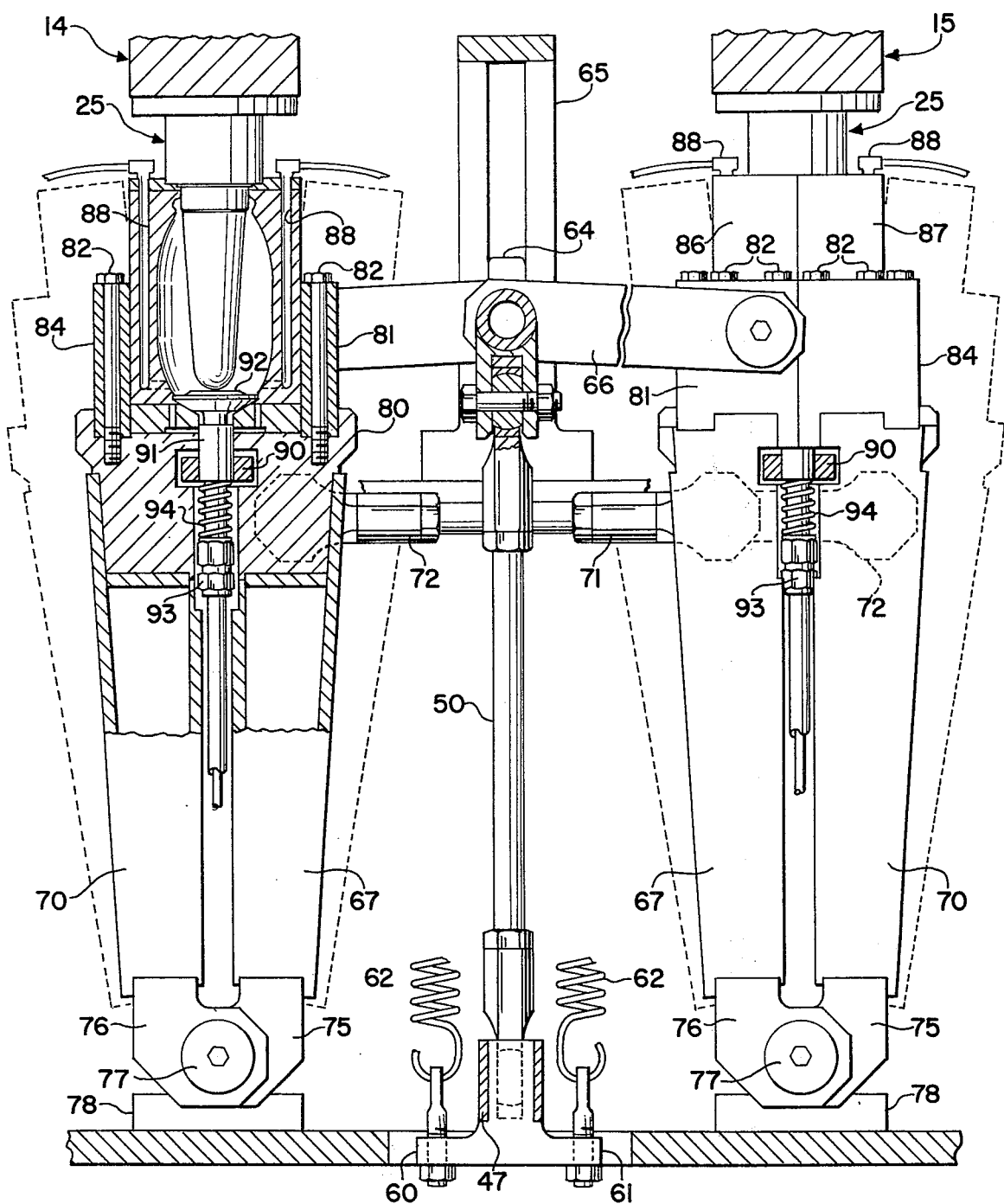
FIG. 3 is an enlarged partially cross-sectional view of the female split mold assemblies.
Figures 4, 5:
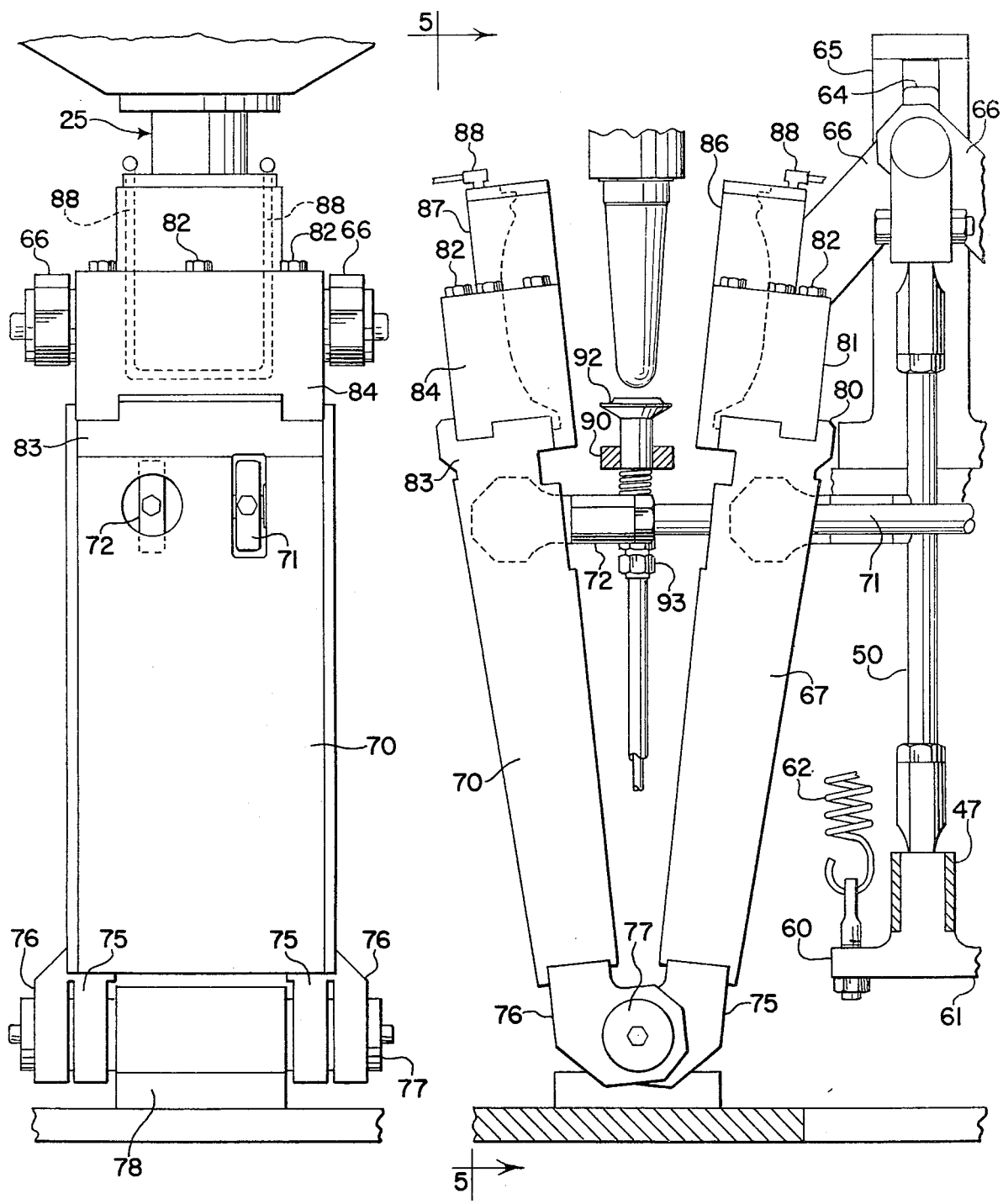
FIG. 4 is a partial view of the molds shown in FIG. 3, but with the mold in the open position.
FIG. 5 is a side elevational view of the mold assembly shown in FIG. 4 and taken substantially in the direction of line 5—5, but showing the mold in the closed position.

The mold assembly 12 is mounted in a substantially vertical direction at the six o'clock position below the carriage 10. In the preferred embodiment, the mold assembly 12 comprises two complete female mold assemblies such as shown in FIGS. 3 and 4, one for each of the mandrel and holder sections 14 and 15. The mold assemblies open and close in a generally vertical plane through the axis of rotation of the carriage 10. Each time the index drive mechanism 17 moves a mandrel and the heat preform carried thereon from the seven to the six o'clock position the mold assemblies are open and a mandrel and its associated preform can move therein. When the carriage 10 is stopped at the six o'clock position, the mold assemblies close about the mandrel and its associated preform. The preforms are then blown outwardly to the configuration of the female blow mold by the application of air under pressure through the mandrel and holder assemblies 25. A reformed container is shown at 158 in FIGS. 1 and 9.

The female blow molds are water cooled and when the container in blowing reaches the walls of the female blow mold, the blown container is cooled to a temperature substantially below forming temperatures. The mold assemblies are then opened and the index drive mechanism 17 will again rotate the carriage 10 carrying the mandrel and its associated blown container to and through the five o'clock position and thence toward and into the four o'clock position.

The pick-off or unloading assembly 13 at the four o'clock position comprises a pair of arms for each mandrel section 14 and 15, and a pair of gripping jaws are mounted on the end of each pair of pick-off arms. Those jaws are shaped to conform to the rim of the reformed or blown container and are positioned sufficiently apart to receive and grip the rim of the blown container therebetween as the carriage 10 moves the mandrel and its associated blown container into the four o'clock position. When the carriage 10 is stopped with a reformed container within the pick-off assembly 13, the pick-off assembly is operated to draw the reformed container from its associated mandrel. A discharge tube associated with the pick-off assembly receives the removed reformed container and by a suitable vacuum-draw discharges the reformed containers from the machine.

The main power source for the machine is the electric motor 30 mounted on the frame of the machine near the lower end thereof. The output shaft of the motor 30 is provided with a pulley 31. The index drive mechanism 17 is provided with a gear reducer and right angle drive mechanism 32 mounted on one side thereof. The output shaft of the mechanism 32 is connected to drive the index drive mechanism 17. The mechanism 32 has a second output shaft which extends through the index drie mechanism 17 and terminates in a sprocket wheel 33. A pulley 34 is mounted on the input shaft of the mechanism 32. A V-belt 35 is mounted about the pulley 31 of the motor 30 and the pulley 34 of the mechanism 32. An idler pulley assembly 36 mounted on the frame of the machine is adjustable and is provided for adjusting tension in the V-belt 35.

The sprocket wheel 33 is used to drive the apparatus that opens and closes the mold assembly 12 and may further be conveniently used to control the operation of the loader assembly 11 and the unloader assembly 13. That apparatus comprises a right angle gear box 40 the input shaft of which carries a sprocket wheel 41. A chain 42 is mounted about the sprocket wheels 33 and 41 to drive the right angle drive gear box 40. An adjustable idler sprocket assembly 43 mounted on the frame is used to adjust slack in the chain 42. Two side-by-side cam wheels 45 and 46 are mounted on the output shaft of the gear box 40.

As best seen in FIG. 1, the cam wheel 45 is associated with a lever assembly 47. One end of the lever assembly 47 is pivotally carried in a bracket assembly 48 mounted on the frame of the machine. The other end of the lever assembly 47 is pivotally connected to the lower end of an operating rod 50. A roller 51 is provided in the lever 47 intermediate the ends thereof. The cam wheel 45 engages the roller 51 and as the cam wheel 45 is rotated the end of the lever assembly 47 connected to the rod 50 is caused to reciprocate upwardly and downwardly. The function and operation of the rod 50 to control the operation of the mold assemblies will be described hereinafter.

The cam wheel 46 operatively engages an air valve 52 mounted on the frame of the machine. The air valve 52 is called the form-air valve and is provided for delivering air under pressure to the mandrel sections 14 and 15 to blow the heated preforms into the reformed configuraton in the mold assembly 12. Intake port 55 is connected to a suitable source of air under pressure. outlet port 54 is connected by a conduit 53 to assembly 49 on the carriage 10. Exhaust port 58 is vented to the atmosphere.

The assembly 49 is called air-vacuum distributor and functions to apply air under pressure from the form-air valve 52 and negative air pressure from a suitable vacuum line to the mandrel and holder assemblies 25 of the two mandrel sections 14 and 15. The vacuum line (not shown) is connected to the fittings 56 on the distributor 49. In one reduction to practice of the invention the air under pressure was in the area of 40 to 60 pounds and the negative air pressure was about 25 inches of mercury. It is not believed necessary to show the internal construction and connections of the distributor 49 as those skilled in the art will understand that various known distributors may be used. Such distributors commonly comprise a stationary plate or housing carrying the air connections and vent connections and terminate in internal ports and grooves or slots. The housing of distributor 49 is fixed against rotation by the bracket 57 secured to the bracket 19.

The mandrel section 14 of the carriage 10 carries an annular series of ports, one for each mandrel and holder assembly 25, and those ports, which rotate with the carriage 10, cooperate with the internal ports and grooves of the housing of the distributor 49 so that form-air and/or vacuum and venting are connected to the appropriate mandrel and holder assemblies 25 of the mandrel section 14 as the carriage 10 is intermittently rotated. Air conduits extending between the mandrel sections 14 and 15 through the hub of the carriage 10 interconnect the mandrel and holder assemblies 25 of those sections which have the same clock positions.

The noted internal porting and arrangement of the distributor 49 is such that at appropriate clock positions, air under pressure, vacuum and venting are connected to the mandrel and holder assemblies 25. The arrangement of the distributor 49 of the present invention can best be described by reference to the clock positions as the carriage 10 is viewed in FIG. 1. The vacuum line is continuously connected to the mandrel and holder assemblies 25 from three o'clock counterclockwise around to the half past six o'clock position. The form-air line is connected to the mandrel and holder assemblies 25 at the six o'clock position. Of course it should be understood that form air to the mandrel and holder assemblies 25 at the six o'clock position is also controlled by the form-air valve 52, and that valve by virtue of the previously described cam wheel 46 delivers form air only after the mold assembly 12 is closed and further shuts off form air and vents before the mold assembly 12 opens. Of the remaining clock positions, venting to ambient air pressure occurs from the half past five o'clock to the four o'clock positions. Between four o'clock and three o'clock, sealing occurs preparatory to vacuum again at three o'clock.

The previously described cam wheel 45 and lever 47 control the operation of the mold assembly 12. The end of the lever 47 connected to the lower end of the rod 50 is provided with a pair of extending ears 60 and 61 as can best be seen in FIGS. 3 and 4. A pair of coiled springs 62 are connected at their lower ends to the ears 60 and 61 of the lever assembly 47. The upper ends of the springs 62 are anchored at suitable positions on the frame of the machine to spring bias the lever 47 upwardly with the roller 51 against the cam wheel 45.

The upper end of the rod 50 is connected to a slide block 64 which is retained for vertical sliding movement within the slides of a U-shaped slide member 65. Two pairs of lever arms 66 are pivotally mounted on the slide block 64 in a horizontally spaced-apart relationship within the slide member 65 and extending in opposite directions. The extending ends of one pair of arms 66 are pivotally connected to and adjacent the upper end of one mold assembly section 67. The extending ends of the other pair of arms 66 are pivotally connected on opposite sides of and at the upper end of the other mold assembly section 67. When the cam wheel 45 permits the springs 62 to pull the lever 47 upwardly, the rod 50 and the slide block 64 are moved upwardly from the position shown in FIG. 3 to that shown in FIG. 4. That upward movement of the slide block 64 moves the levers 66 upwardly to pivot the inner mold sections 67 toward each other from the closed positions shown in FIG. 3 to the open positions shown in FIG. 4.

The outer mold sections 70 of each mold assembly are moved between the open and closed positions by links 71 and 72 each of which is connected between the outer mold section 70 of one mold assembly and the inner mold section 67 of the other mold assembly. Thus, the link 71 is pivotally connected to the inner mold section 67 of the right mold assembly shown in FIG. 3, and extends through the opposite inner mold section 67 and is pivotally connected to the outer mold section 70 of the left mold assembly shown in FIG. 3. Correspondingly one end of the arm 72 is pivotally connected to the inner mold section 67 of the left mold assembly shown in FIG. 3 and the other end of arm 72 is pivotally connected to the outer mold section of the right mold assembly shown in FIG. 3.

Each of the mold sections 67 and 70 has a lower frame portion which may be conveniently made of welded plates such as partially shown in the left mold assembly in FIG. 3. The lower end of each mold section frame portion is provided with a pair of spaced-apart bearing blocks. The inner mold sections 67 are provided with bearing blocks 75 and the outer mold sections 70 are provided with bearing blocks 76. The bearing blocks 75 and 76 are pivotally mounted on a bearing pin 77, and each bearing pin 77 is carried intermediate its ends in a bracket 78 suitably mounted to the lower frame of the machine.

The upper end of each mold section 67 and 70 is provided with a mold supporting block. The mold supporting block of the inner mold sections 67 comprises two members 80 and 81 secured together by bolts 82. The mold supporting block of the outer mold sections 70 is made of two members 83 and 84 secured together by bolts 82. Each mold supporting block carries one-half of the female blow mold the interior surface of which is configured to the desired shape of the finished or blown container. A blow mold half 86 is carried in the upper end of the mold supporting block of each of the inner mold sections 67 and a blow mold half 87 is carried in the mold supporting block of each outer mold section 70. As shown in FIG. 5, each half of the blow mold 86 and 87 is provided with a U-shaped passageway 88 extending therethrough for the passage of cooling water therethrough to maintain the interior surface of the blow mold halves 86 and 87 at a temperature sufficiently low to cool the blown container to a temperature substantially below the forming temperature of the thermoplastic material of the preform upon contact with the walls thereof. The water passageways 88 terminate in hose fittings on the upper surfaces of the mold halves 86 and 87 and suitable hoses 89 shown in FIG. 2 interconnect the passageways 88 and are in turn connected to a suitable source and return of cooling water.

Each of the mold assemblies further includes a container bottom forming plug 92. The underside of the plug 92 has a tube extending through a bushing 91 and terminating in a coupling 93. The bushing 91 is fixedly carried through a support member 90 which is secured between opposite sides of the frame of the machine. A coiled spring 94 compressed between the support member 90 and the coupling 93 spring biases the plug 92 downwardly. When the two mold sections 67 and 70 are closed from the position shown in FIG. 4 to that shown in FIG. 3, the inclined lower inner edges of the blow mold halves 86 and 87 engage the inclined underside of the plug 92 and cam the plug 92 upwardly to the position shown in FIG. 3. The upper surface of the plug 92 is shaped to form the desired bottom configuration in the blown container. Obviously upon the opening of the molds the plug 92 is moved downwardly out of engagement with the blown container to permit the carriage 10 to carry the blown containers out of the molds. Two concentrically arranged plastic tubes are connected to the coupling 93 and to the source and return of cooling water to cool the plug 92.

In addition to the above described cooling arrangement for the molds, cooling water is also supplied to the mandrel sections 14 and 15 to cool the areas of those sections carrying the mandrel and holder assemblies 25. That cooling water is delivered to and returned from the machine through two water lines 95 and 96 shown in FIG. 2. The lines 95 and 96 are connected to a rotary water coupling 97 mounted on the index drive mechanism 17. The coupling 97 and lines 95 and 96 are not shown in FIG. 1. From the rotary coupling 97 a pair of water lines (not shown) are extended through the index drive mechanism to and through appropriate annular passageways in the radially outward hub areas of the mandrel sections 14 and 15 and on the sides of the mandrel and holder assemblies 25. The rotor of the carriage 10 is made of a metal such as aluminum, and the holder portions of the mandrel and holder assemblies 25 are cooled by the conduction of heat to the described annular passageways.

Figure 7:
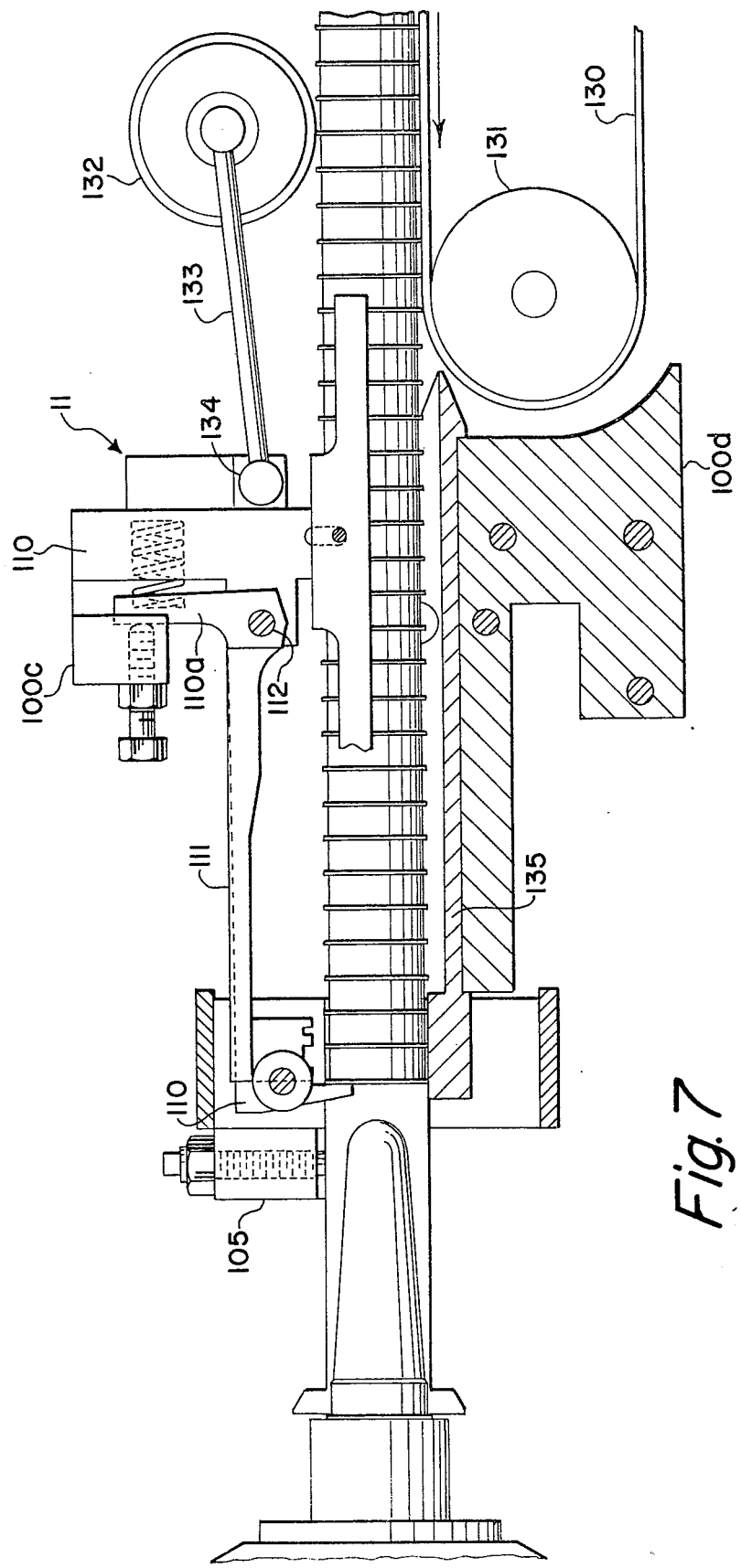
FIG. 7 is a view similar to FIG. 6, but with a further number of parts removed.
Figure 8:
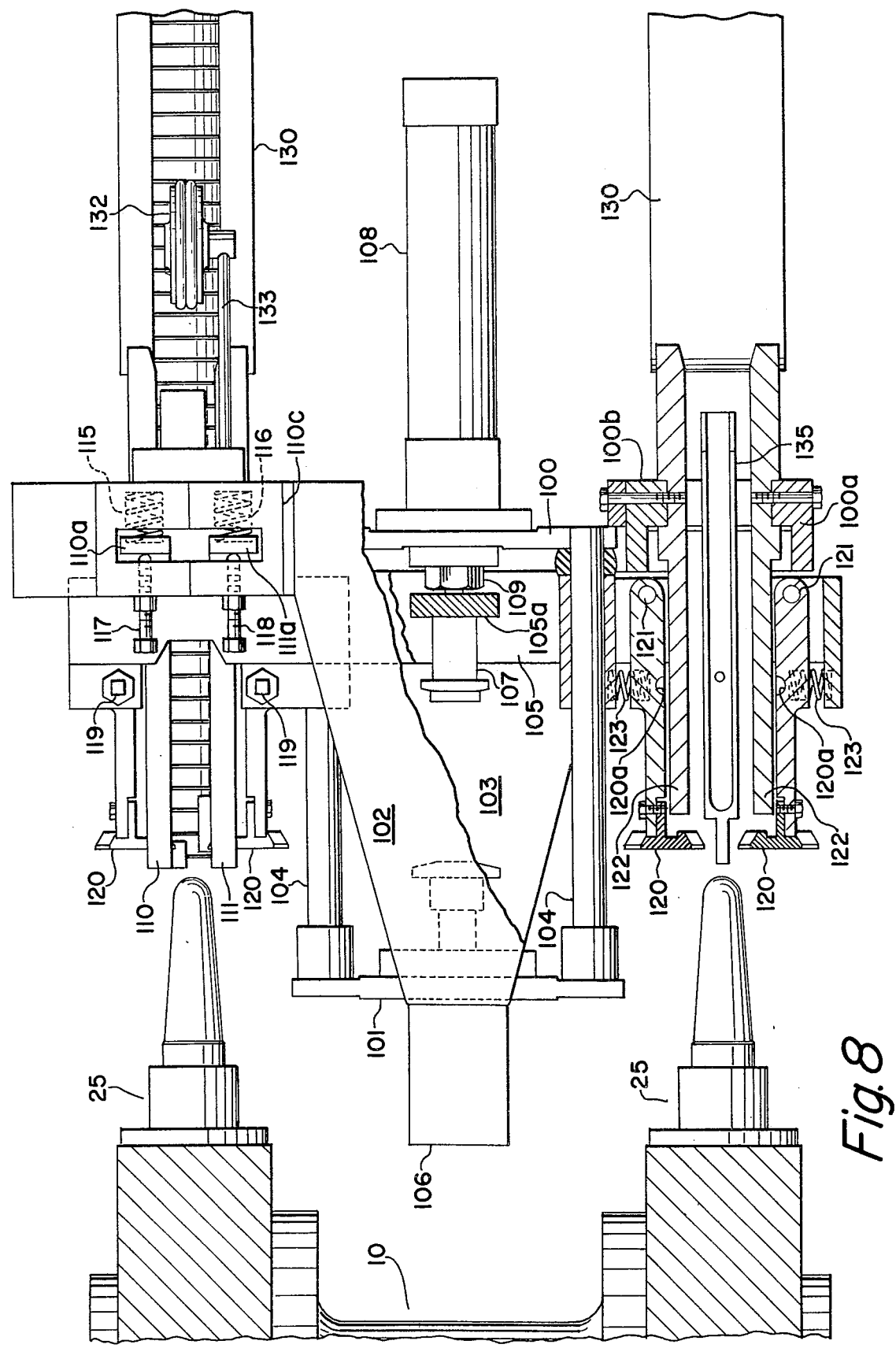
FIG. 8 is a top plan view partially in cross section of the loading structure shown in FIGS. 6 and 7.

The preform loading assembly 11 of the machine is shown in enlarged detail and in cross section in FIGS. 6, 7 and 8. The loading assembly 11 comprises a main supporting section of a main supporting plate 100, a bumper plate 101, upper and lower horrizontal plates 102 and 103, and a pair of rods 104. The plate assembly 100, which includes a number of members bolted and/or welded together such as members 100a–100d, is secured to the frame of the machine to upstand therefrom. The upper and lower plates 102 and 103 and the rods 104 are connected between the bumper plate 101 and the main supporting plate assembly 100. A sliding block assembly 105 is journaled on the rods 104 and movable from a rearward position against bumper stops on the rods 104 to a forward position determined by the shock absorber assembly 106 and the extending forward end of the piston rod assembly 107 of the air operated piston and cylinder assembly 108. The shock absorber assembly 106 is mounted on the plate 101 with the piston thereof extending rearwardly of the plate 101 on the axis of the cylinder 108. The cylinder 108 is secured to the main mounting plate assembly 100 by the nut 109 and washer threaded over a collar on the cylinder. The piston rod of the cylinder 108 extends through that collar. The piston rod assembly 107 comprises a bumper threaded on a stud which extends through a vertical plate 105a of the sliding block assembly 105 and is threaded over the piston rod of the cylinder 108. When air under pressure is admitted to the head end of the cylinder 108, tthe sliding block assembly 105 is moved forwardly on the rods 104 until the extending end of the piston rod assembly 107 strikes the shock absorber assembly 106.

The plate assembly 100 further carries two escapement and positioning levers 110 and 111 for each preform loading section of the loading assembly 11. The rearward ends of the levers 110 and 111 are pivotally mounted on the main supporting plate assembly 100 by pins 112. The rearward end of each lever 110 and 111 has an upstanding arm 110a and 111a. The sliding block assembly 105 carries a pair of rollers such as roller 113 in FIG. 6 which raise and lower the forward extending ends of the arms 110 and 111 as the sliding block assembly 105 is moved forwardly and rearwardly by the air cylinder 108. The underside of the levers 110 and 111 engaged by the rollers 113 is profiled to provide the desired upward and downward motion to the extending ends of those levers. That profile for lever 110 is such that as the leading preform is initially moved forwardly for application to a mandrel and holder assembly 25, the forward depending end of the lever 110 drops in front of the rim of the next preform of the nested stack to prevent the stack from moving forwardly. The lower forward end of the lever 111 has three depending projections 111b, 111c and 111d. The profile of lever 111 is such that when the slide block 105 is retracted, the forward depending end of the lever 111 is down in cooperation with the first, second and third preforms of the nested stack.

In that position, projection 111b is immediately rearwardly of the rim of the first preform and projection 111c is immediately rearwardly of the rim of the second preform, while projection 111d is immediately forwardly of the third preform. Assuming that the slide block 105 is then moved forwardly to apply the first preform in the manner described hereinafter, the depending end of lever 110 will drop behind the rim of the first preform as it is moved forwardly and thereafter the depending end of lever 111 will be raised. The stack of preforms will then be moved forwardly by continously rotating belt 130 in the rear portion of the loading assembly 11 to place a new leading or next preform against the depending end of lever 110. After the leading preform has been applied to the mandrel and holder assembly 25, the slide block 105 is then retracted. As the slide block 105 returns, the depending end of lever 111 drops with projection 111b immediately rearwardly of the rim of the new leading preform and with projections 111c and 111d between the rims of the second and third preforms. Complete retraction of the slide block 105 raises lever 110 from engagement with the leading preform preparatory to its application to the next mandrel and holder assembly 25. Springs 115 and 116 mounted between the main supporting plate assembly 100 and the upper ends of the arms 110a and 111a of the levers 110 and 111 bias the levers 110 and 111 downwardly against rollers 113. The maximum lowered position of the forward ends of the levers 110 and 111 is determined by the bolts 117 and 118 which are threaded through the main supporting plate assembly 100 and engage the upper ends of the lever arms 110a and 111a on the sides thereof opposite from the sides engaged by the coiled springs 115 and 116.

The leading preform of each loading section is advanced and fully applied to the mandrel and holder assemblies 25 by a pair of opposed lever arms or fingers 120. The rearward ends of the lever arms 120 are pivotally connected to the sliding block assembly 105 by pins 121 as shown in FIG. 8. The lever arms 120 are spring biased against vertically downwardly extending adjustable stops 119 which enter slot 120a in the upper surface of the levers 120 intermediate the ends thereof. Coiled springs 123 are each carried between a fixed wall of the slide block 105 and one of the levers 120 intermediate its ends. When the slide block 105 is in the completely retracted position, shown in FIG. 8, the opposed forward ends of each pair of fingers 120 will engage the leading preforms immediately rearwardly of the rim portions thereof. As the air cylinder 108 is extended to move the sliding block assembly 105 forwardly, the opposed ends of the fingers 120 will carry the leading preforms forwardly over and onto the mandrel and holder assemblies 25. The portion of the holder of the mandrel and holder assemblies 25 which engages the internal rim portion of the preform to sized to produce an interference fit within that rim portion of the preforms. Thus, when the cylinder 108 is retracted to move the slide block assembly 105 rearwardly to retract the finger arms 120, the opposed ends of the fingers 120 will slide from the rim surface of the applied preforms as the applied preforms are frictionally retained on the mandrel and holder assemblies 25. When the slide block assembly 105 is completely retracted, the opposed ends of the fingers 120 will cam over the rim portion of the next leadiang preforms to engage the next leading preforms rearwardly of the rim portions. While the opposed ends of the fingers 120 are being cammed over the next leading preforms, the projections 111b of the levers 111 will hold the leading preforms in the proper forward position. leading Preform guide plates 122 are secured to the main supporting plate assembly 100 and engage and guide opposite sides of the nested stacks of preforms as they are urged through the loading mechanism 11.

The stack of nested preforms for each loading section are delivered and urged in a forward direction by a continuously rotating belt assembly comprising belt 130 and forward pulley 131. Although not shown, the invention contemplates that the belts 130 extend rearwardly about another pulley and beneath an appropriate hopper for delivering stacks of nests preforms onto the belts 130. A roller 132 rotatively carried on a lever arm 133 functions as a hold down device to maintain the stack of preforms downwardly on the belt 130. The lever arm 133 is in turn pivotally connected at 134 to the rearward side of the main supporting plate assembly 100. As the stack of preforms progresses off of the belt 130 the stack is received between the guide members 122 and on top of the longitudinal member 135 shown in FIG. 8. The member 135 is secured to and extends forwardly of the main supporting plate assembly 100.

The air cylinder 108 of the loading mechanism 11 is controlled by a suitable air valve (not shown) associated with the index drive mechanism 17. Any suitable camming arrangement known in the art may be used to operate the air valve for the air cylinder 108 to extend and retract the air cylinder 108 during each interval when the index drive mechanism 17 stops the carriage at each rotatively indexed position.

The unloading assembly 13 which simultaneously removes two reformed containers from the mandrel and holder assemblies 25 of the two mandrel sections 14 and 15 at the four o'clock position is also operated by an air cylinder which is also controlled by a suitable valve in turn controlled by a suitable cam driven from the index drive mechanism 17. The unloading assembly 13, as shown in the top plan view in FIG. 9, comprises a slide assembly 140 connected to the piston rod 141 of the air cylinder 142.

The slide assembly 140 comprises upper and lower plates between which are secured a plate 143 for the connection of the piston rod 141, a pair of cylindrical members 144 for supporting the assembly 140 on a pair of rods 145, and two substantially square ring members 146 for carrying the gripping arms 147. The rearward end of the rods 145 extend through a mounting plate 148 and are fixedly secured to the plate by fasteners 150 and mounting blocks 151. Each rod 145 carries a resilient bumper 152 immediately forwardly of the plate 148. The forward end of each rod 145 also provided with a resilient bumper 152 secured thereon by a fastener assembly 154. The rods 145 extend through bushings in the cylindrical members 144 to slidably support the assembly 140 for reciprocating movement forwardly and rearwardly between the bumpers 152.

The plate 148 is secured to a pair of brackets 155 which are in turn secured to the frame of the machine as may be seen in FIG. 1.

The plate 148 further carries a pair of vacuum tubes 156, the forward ends of which extend through the openings in the square rings 146 of the assembly 140. Suitable negative air pressure is applied to the rearward ends of the vacuum tubes 146 for drawing reformed containers therethrough to discharge those containers from the machine. The underside of each tube 156 at the forward end thereof is provided with a saddle, each end of which carries an upstanding roller 157. The rollers 157 cooperate with the gripping arms 147 to spread the arms 147 when the arms 147 are completely retracted by the assembly 140 to release a reformed container such as container 158 into the forward end of the vacuum tubes 156. The pair of arms 147 for each container removal section of the unloading assembly are secured at their rearward ends to the side walls of the square rings 146 and extend forwardly thereof. The forward ends of each pair of arms 147 are provided with opposed shaped gripping jaws 160 for gripping the rim portion of the reformed container. The inner forward side of each arm 147 is further provided with a cam surface which engages one of the rollers 157 when the assembly 140 is retracted to move the gripping jaws 160 away from the rim portion of the reformed container. The forward ends of the arms 147 are urged together to cause the gripping jaws 160 to grip the rim portion of a reformed container by a pair of blocks 162. Each pair of blocks 162 is secured to the forward end of a support member 163. The rearward ends of the support member 163 are secured to the frame of the machine as may be seen in FIG. 1. The inner opposed sides of each pair of blocks 162 are provided with a cam surface 162a. The cam surfaces 162a engage the forward outward sides of the arms 147 when the assembly 140 is moved forwardly and urge each pair of arms 147 together to cause the gripping jaws 160 to grip the rim of the reformed container.

One of the mandrel and holder assemblies 25 is shown in enlarged cross section in FIG. 10. FIG. 11 shows a perspective view in reduced size from the showing of FIG. 10 of one of the preforms 200 for the subject invention. The preforms 200 are made of a thermoplastic material and are provided with a radially outwardly extending rim flange 201, an annular stacking shoulder 202 and a substantially tapered side wall tapered from the stacking shoulder to a substantially semispherical bottom wall 203. The preforms 200 in a preferred embodiment is further substantially elongated so that the length thereof is many times the largest diameter. The invention contemplates that domed or generally pointed shapes other than a semispherical shape can be used for the bottom wall 203.

The mandrel 204 of the mandrel and holder assembly 205 is formed of a material of high thermal conductivity, such as aluminum, and the relatively smooth outer surface of the mandrel 204 substantially conforms to the interior configuration of the preform 200 except in two important respects. The two important differences in the mandrel 204 configuration are, firstly, that the annular shoulder 205 on the mandrel 204 which engages a substantial portion of the inner surface of the preform 200 above the stacking shoulder 202 is longitudinally spaced from the tip of the mandrel 204 a distance greater than the spacing of the inner surface of the stacking ring 202 of the preform 200 from the inner tip of the preform 200. That distance represented by the upward spacing of the shoulder 205 must be great enough to allow the preform 200 to reach molding temperatures at the same time or before the inner surface of the stacking ring 202 reaches the shoulder 205. Thermoplastic materials will expand and thereafter contract in being heated from ambient temperatures, such as 72°F., to forming temperatures such as 250°F., which is the forming temperature for materials such as polystyrene. Since the preform 200 is heated by heat conducted from the mandrel 204 to the preform 200, intimate physical contact must be maintained uniformly between the inner surface of the preform 200 and the surface of the mandrel 204 during heating. If adequate spacing is not provided between the shoulder 205 and the inner surface of the stacking ring 202, the preform 200 as it is initially heated will expand longitudinally with a consequent physical separation between the surface of the mandrel 204 and the inner surface of the preform 200. Once that separation occurs, heat will not be conducted from the mandrel 204 to the preform with consequent poor heating of the preform 200 for proper blowing. Physical separation in amounts as low as a few thousandths of an inch will result in poor and uneven heating of the preform.

The second important difference between the configuration of the mandrel 204 and the preform 200 is that the mandrel 204 does does not engage the inner rim portion of the preform 200. In the rim portion of the preform 200 the mandrel is reduced in diameter to provide the reduced annular section 206. The reduced annular section 206 prevents the mandrel 204 from heating the inner rim portion of the preform 200. Thus, the rim portion of the preform will remain substantially at ambient temperatures. Maintaining the rim portion of the preform 200 at ambient temperature is important in the present invention for a number of reasons. Firstly, the holder 207 is provided with an annular projection 208, the outer surface of which has a diameter to produce a friction fit between the outer surface of the section 208 and the inner surface of the rim portion of the preform 200. Secondly, the maintenance of the rim portion of the preform at ambient temperatures further provides accurate predetermined correspondence between the rim portion and the capping means later used to seal the container after filling.

The friction fit between the rim portion of the preform 200 and the annular projection 208 on the holder 207 should be such as to effectively seal the cooperating surfaces against air leakage, but permit sliding movement in an axial direction when the preform 200 expands during heating from ambient temperatures to molding temperatures. An important feature of the annular projection 208 is that it has an axial length sufficient to permit the preform to expand further onto the annular projection 208. In one reduction to practice where the preform had a length of approximately four inches, the observed expanding movement of the preform 200 over the annular projection 208 was as much as one sixteenth of an inch.

From the foregoing it may be seen that to provide for accurate controlled heating of a preform on a mandrel where the preform will be substantially elongated, is formed from a thermoplastic material and is relatively thin walled, the mandrel construction must be such as to accurately conform to the inner wall configuration of the preform, but must permit the preform to expand on the mandrel while maintaining good physical contact therewith and effective sealing at the rim of the preform. To that end, the mandrel and preform construction for the subject invention, in which the mandrel is a heated mandrel and in which a vacuum-draw is used to aid in holding the preform on the mandrel, provides that the mandrel and preform be complementary tapered to the closed end with the closed end being shaped to permit the preform to move in a axial direction along the surface of the mandrel when the preform is expanding during heating of the preform from ambient temperatures to molding temperatures. Such an end configuration to the preform and mandrel is the domed shape shown in the drawing. That domed shape provides that the preform 200 will remain in close physical contact with the mandrel 204 during expansion of the preform from ambient temperatures to molding temperatures.

The heating means for the mandrel 204 is an electrical cartridge heater 210 disposed axially of the mandrel 204 and extending through the holder 207 into the mandrel section 14 of the carriage 10. Suitable electrical conductors 211 for connecting power to the heater 210 are extended from all of the heaters in the carriage 10 to a commutator assembly 212 such as shown in FIG. 2. The commutator assembly 212 may be of any type previously known in the art. The invention further contemplates that thermocouples may be built into the heaters 210 to control the temperature of the heaters 210. Control conductors from the thermocouples may also be directed through the hub of the carriage 10, through the center of the commutator 212, to a thermocouple commutator shown in FIG. 2 at 213. The thermocouple commutator 213 may be of any suitable type known in the art and generally includes means for adjusting the control temperatures of the thermocouples.

The holder 207 and particularly the annular projection 208 are insulated from the mandrel 204 and the heater 210 by a collar 215 and a cup 216. The collar 215 and cup 216 are formed of a thermally insulating material. The collar 215 is applied about the reduced cylindrical portion 217 of the mandrel 204 and a snap ring 218 is inserted in an appropriate snap ring groove in the portion 217 of the mandrel 204 to hold the collar 217 on the mandrel. The cup 216 is mounted in the holder 207 with the end of the portion 217 of the mandrel 204 engaging the inner surface of the cup 216. A fastener such as cap screw 220 is threaded through the holder 207 at an angle to and against an angled recess in the collar of 215. The cap screw urges the collar 215 against the snap ring 218, and the snap ring 218 urges the reduced cylindrical portion 217 of the mandrel against the cup 216, which, in turn, is firmly urged against an inner wall of the holder 207. The reduced section 206 of the mandrel 204 within the annular projection 208 of the holder 207 has an axial length great enough to provide an annular open area or space 222 between the projecting end of the annular projection 208 of the holder 207 and the lower end of the reduced annular section 206 of the mandrel 204. The spaced 222 is provided for application of vacuum or forming air to the area between the surface of the mandrel 204 and the interior surface of the preform 200.

The holder 207 is secured to the hub portion of the carriage 10 by a series of cap screws such as cap screw 223, which extend through a radial flange of the holder 207 and into the hub portion of the carriage. The vacuum and form-air lines previously described are connected to the passageway 224 in the hub portion of the carriage. Passageway 224 opens into a recess 225 in the base of the holder 207. The recess 225 opens into a central opening about the heater 210 and through the opening 226 in the cup 216. The opening 226 is connected to the upper end of the central passageway 227 through the annular reduced section 217 of the mandrel 204. A series of radial holes 228 are provided through the reduced section 206 of the mandrel 204 to connect the passageway 227 to the annular space within the projection 208 of the holder 207 and the previously noted spaces 222 to the interior surface of the preform 200. The O-rings 230 and 231 prevent air leakage from the holder 207.

With the foregoing described arrangement of the mandrel and holder assembly 25 and the preform 200 as accurately controlled uniform heating of the thin walled preform is accomplished. The friction and air sealing fit of the maintained cool rim portion of the preform 200 on the holder 207 permits air to be exhausted from between the preform 200 and the mandrel 204 with the result that the preform will be in good physical contact with the surface of the mandrel for uniform accurate conduction of heat from the mandrel 204 to the preform 200 below the rim portion thereof. That good physical contact will be maintained as the preform 200 is heated above ambient temperatures toward forming temperatures for as the preform expands it will move further onto the mandrel and holder assembly 25. Of course, once the preform reaches forming temperatures the thermoplastic material softens and while there then is a tendency for the plastic to shrink, the vacuum-draw and the described friction sealing fit of the rim portion will maintain the preform securely on the mandrel and holder assembly 25.

Having described the invention, it is to be understood that changes can be made in the described embodiment by one skilled in the art within the spirit and scope of the appended claims.

We claim:

1. A mandrel assembly for heating and blowing a preform in which the preform is at ambient temperatures when it is received onto the mandrel assembly and in which the preform is formed of a thermoplastic material and comprises an annular rim portion and an elongated cone-shaped body portion extending from said rim portion to an opposite rounded closed end, said mandrel assembly having a first outer surface portion substantially complementary configured to the interior shape of said preform with one end being rounded and the other end being cylindrical, passageway means through said mandrel assembly to said cylindrical end of said first outer surface portion for drawing air from between said first outer surface portion and the interior of any preform mounted thereon, means in said mandrel assembly for conductively heating said outer surface portion to conductively heat any preform in contact therewith, said mandrel assembly further including a cylindrical holder portion in axial alignment with said first outer surface portion and spaced from said other end of said outer surface portion to receive the rim portion of a preform thereabout and to effect at least a substantial air seal with said rim portion of any preform mounted thereon, said cylindrical holder portion being thermally insulated from said means in said mandrel assembly for conductively heating said outer surface portion, and outer surface of said cylindrical holder portion hving a length sufficient to permit any preform mounted about said first outer surface portion with the rim portion thereof about said cylindrical holder portion to expand longitudinally further over the outer surface of said cylindrical holder portion responsive to the heating of said preform from said ambient temperatures to forming temperatures.

2. A preform and mandrel assembly, said preform formed of a thermoplastic material and comprising an annular rim portion and an elongated body portion extending from said rim portion to an opposite closed end, the interior surface of said elongated body portion being shaped substantially as a cone with a rounded tip at said opposite closed end, the outer surface of said mandrel assembly being substantially complementary configured to the interior shape of said preform, said preform mounted on said mandrel assembly in substantially uniform surface contact with said mandrel assembly, said mandrel assembly having an annular portion within said rim portion of said preform and being of a size to effect at least a substantial air seal between said annular portion of said mandrel assembly and the interior surface of said rim portion of said preform, passageway means through said mandrel assembly for drawing air from between said mandrel assembly and the interior of said preform, and said annular portion of said mandrel assembly having a length sufficient to permit said preform to expand longitudinally further onto said mandrel assembly responsive to the heating of said preform from ambient temperatures to forming temperatures, and means mounted within said mandrel assembly for conductively heating said mandrel assembly below said annular portion thereof to in turn conductively heat said preform.

3. A preform and mandrel assembly as defined in claim 2, wherein said annular portion of said mandrel assembly is further of a size to effect frictional holding of said preform on said mandrel assembly sufficient to support the weight of said preform but permit the further expansion of said preform over said annular portion of said mandrel assembly responsive to the heating of said preform from ambient temperatures to forming temperatures.

4. A preform and mandrel and holder assembly, said preform formed of a thermoplastic material and comprising a rim portion and a tapered elongated body portion substantially internally tapered from said rim portion to an opposite closed end, the internal surface of said opposite closed end being substantially curvilinearly concave shaped, said holder having an extending portion, means mounting said mandrel on said holder in axial alignment with said extending portion of said holder, said mandrel and said extending portion of said holder being substantially complementary configured to the interior configuration of said preform, said preform mounted on said mandrel and said extending portion of said holder in substantial uniform surface contact and with said extending portion of said holder within said rim portion of said preform, said extending portion of said holder being of a size to effect at least a substantial air seal between said extending portion of said holder and the interior surface of said rim portion of said preform, passageway means through said holder and between said extending portion of said holder and said mandrel for drawing air from between said mandrel and the interior of said preform, and said extending portion of said holder having a length sufficient to permit said preform to expand longitudinally further onto said extending portion of said holder responsive to the heating of said preform from ambient temperatures to forming temperatures, and means mounted within said mandrel for conductively heating said mandrel to in turn conductively heat said preform.

5. A preform and mandrel and holder assembly as defined in claim 4, wherein the internal surface of said opposite closed end of said preform is substantially semispherical in shape.

6. A preform and mandrel and holder assembly as defined in claim 4, wherein said means mounting said mandrel on said holder comprises a supporting member formed of a thermally insulative material to substantially thermally insulate said extending portion of said holder from said mandrel.

7. A preform and mandrel and holder assembly as defined in claim 4, wherein said extending portion of said holder is further sized to effect a frictional retention of said rim portion of said preform on said extending portion of said holder, said frictional retention permitting said preform to exapand longitudinally further onto said extending portion of said holder responsive to the heating of said preform from ambient temperatures to molding temperatures.

* * * * *